(12) United States Patent
Cherukumalli et al.

(10) Patent No.: US 10,925,274 B2
(45) Date of Patent: Feb. 23, 2021

(54) SMART TRAP FOR MOSQUITO CLASSIFICATION

(71) Applicants: Satish K. Cherukumalli, Satish K. Cherukumalli, SC (US); Terry DeBriere, Jacksonville, FL (US)

(72) Inventors: Satish K. Cherukumalli, Satish K. Cherukumalli, SC (US); Terry DeBriere, Jacksonville, FL (US)

( * ) Notice: Subject to any disclaimer, the term of this patent is extended or adjusted under 35 U.S.C. 154(b) by 239 days.

(21) Appl. No.: 16/269,144

(22) Filed: Feb. 6, 2019

(65) Prior Publication Data

US 2020/0245604 A1  Aug. 6, 2020

(51) Int. Cl.
  *A01M 1/10* (2006.01)
  *A01M 1/02* (2006.01)
  *A01M 1/08* (2006.01)

(52) U.S. Cl.
  CPC ............ *A01M 1/106* (2013.01); *A01M 1/026* (2013.01); *A01M 1/08* (2013.01); *A01M 2200/012* (2013.01)

(58) Field of Classification Search
  CPC ......... A01M 1/106; A01M 1/026; A01M 1/08
  See application file for complete search history.

(56) References Cited

U.S. PATENT DOCUMENTS

| | | | |
|---|---|---|---|
| 5,081,788 A * | 1/1992 | Dowd | A01M 1/02 43/107 |
| 6,840,003 B2 | 1/2005 | Moore | |
| 9,915,732 B2 | 3/2018 | Weber-Grabau | |
| 2004/0093190 A1* | 5/2004 | Beroza | A01M 1/106 702/189 |
| 2006/0260183 A1* | 11/2006 | Hockaday | A01M 1/023 43/129 |
| 2011/0030266 A1* | 2/2011 | Roy | A01M 1/08 43/113 |
| 2011/0283597 A1* | 11/2011 | Coventry | A01M 1/08 43/107 |
| 2014/0165452 A1* | 6/2014 | Rocha | A01M 1/06 43/113 |
| 2015/0160958 A1 | 6/2015 | Heo | |
| 2015/0264911 A1* | 9/2015 | Moad | A01M 1/08 43/113 |
| 2017/0273291 A1* | 9/2017 | Yoo | A01M 1/06 |
| 2017/0290318 A1 | 10/2017 | Bergengren | |
| 2018/0084772 A1 | 3/2018 | Peeters et al. | |
| 2018/0340053 A1* | 11/2018 | Larsen | C08K 3/015 |
| 2020/0187481 A1* | 6/2020 | Geier | A01M 1/06 |

* cited by examiner

*Primary Examiner* — Magdalena Topolski
*Assistant Examiner* — Kari A Bradberry
(74) *Attorney, Agent, or Firm* — Lawrence J. Gibney, Jr.

(57) ABSTRACT

In order to appropriately address concerns of mosquitoes which carry disease, this device has been created to initially classify the mosquito to formulate appropriate extermination strategies. Classification of mosquitoes is typically done through the wing beat frequency by either noise or light interruption. It is important to be aware that not all mosquitoes are harmful and any data that may be collected concerning the harmful mosquito should be as accurate as possible to avoid altering the food supply in any particular area.

14 Claims, 5 Drawing Sheets

SMART TRAP FOR MOSQUITO CLASSIFICATION

FIELD OF INVENTION

This relates to tracking mosquitoes for the purpose of identifying particular types of mosquitoes to apply insecticide and pesticides in order to control the population of certain species of mosquitoes. Certain types of mosquitoes carry diseases, such as malaria and the Zika virus to name a few. These diseases can wreak tragic results for humans. However, not all mosquitoes carry the Malaria or Zika viruses and it is important to maintain the appropriate balance between the "good" mosquito that is a food source and the mosquito that carries infectious disease. While it is important to eradicate the type of mosquitoes that carry harmful diseases, damage to the environment and the food supply should be minimized.

According to National Vector Borne Disease Control Program, Malaria is a public health problem in several parts of India. About 95% population in the country resides in malaria endemic areas. According to the 2015 World Health Organization Malaria Report, 214 million cases of malaria occurred world-wide, leading to 438,000 deaths. It is estimated that roughly 5% of these cases occurred in India (10.7 million cases/21,900 deaths).

Increasing human activities, such as urbanization, industrialization and construction projects with consequent migration, deficient water and solid waste management and indiscriminate disposal of articles (tires, containers, junk materials, cups, etc.) create conditions favorable for mosquito growth and thus contribute to the spread of vector borne diseases.

According to the estimates of a 16-member committee set up by the National Vector Borne Disease Control Programme (NVBDCP) to assess India's actual malaria death burden, the total annual number of cases in India may be about 9.7 million, with about 30,014-48,660 deaths (40,297 on an average).

Other mosquito-borne diseases like Dengue Fever, Chikungunya, Filariasis, Japanese Encephalitis and now the Zika Virus pose a heavy socio-economic burden on developing countries like India. For example, India is home to 34% of world-wide Dengue infections.

Local and central governments have traditionally tackled the mosquito menace with curative solutions, such as spraying of insecticides and larvicides. However, over time this has led to increasing resistance among mosquitoes and also negatively impacts vulnerable sections of the population like infants, the elderly and pregnant women.

As a result, there is major interest in development and application of preventive solutions to the problem of mosquito-borne diseases. The above facts provide clear evidence of the need for better control methodologies to aide in the reduction of mosquito populations. To this end, we endeavor to implement a new, affordable mosquito sensor system that would operate autonomously, and use state-of-the-art IOT technology to alert health and human services agencies of the need to target for treatment specific geographic areas, in an effort to control the mosquito populations responsible for the spread of vector-borne diseases.

A combination of improved insect population control and improved medical treatment services could have a significant socio-economic impact on the lives of millions of people.

This relates to the classification of mosquitoes and then taking appropriate remedial action such as applying insecticides to the appropriate area. This type of trap is designed to isolate a harmful mosquito and eliminate those from any given area. In order to be able to do that, the appropriate mosquito must be classified.

PRIOR ART

There are many prior art references to mosquito traps. A representative example of this can be found at Moore U.S. Pat. No. 6,840,003. This is a light emitting insect trap that is comprised of a light, a fan, and a catch bag. The light is used to attract a mosquito and the fan is used to suck the mosquito or any insect into a catch bag. The catch bag can then be opened for disposal of the trapped insects.

Another representative example can be found at Weber-Grabau, U.S. Pat. No. 9,915,732, which is an insect detection system. This patent teaches a fan in a funnel to draw the insects into the trap. This patent also identifies mosquitoes by wingbeat frequency using a light sensor. The light sensor also determines the size of the mosquito. It however does not teach the exact configuration as found in the current application.

Another reference is Peteers, U.S. Patent Application Publication 2018/0084772, which is specially trap for ground truthing. Insect recognizing system. The Peteers reference teaches the use of sensors in insect traps for classification purposes. The Peteers's reference, however does not utilize a funnel or fan within the trap.

Another reference is Pegram U.S. Patent Application Publication which is a system for detecting and tracking airborne organisms such as mosquitoes. The Pegram reference does describe the use of an imager, a black light source and a processor to identify the biological properties of an organism. However, the Pegram does not teach or disclose the present device.

BRIEF SUMMARY OF THE INVENTION

This device is attached to outside structures such as trees or buildings and will trap and classify mosquitoes for a specific area. The purpose of classification of mosquitoes is to develop strategies to eradicate the type of mosquito that may inhabit a certain area. Most mosquitoes are harmless to humans and animals and provide necessary food for other inhabitants of the ecosystem, but the relatively small number of mosquitoes that are harmful and all attempts to reduce their deleterious impact should be undertaken.

It has been previously determined that certain types of mosquitoes will exhibit certain types of behaviors. For instance, certain harmful mosquitoes will travel at certain times of the day; others will travel at different times. Additionally, certain types of mosquitoes swarm close to the ground while others will swarm at a higher elevation. Regardless of the specific type of behavior, this trap will capture the mosquito and classify it so that extermination efforts can be undertaken to eliminate the harmful type of mosquito.

The device will be comprised of a tubular housing that is hollow and in the shape of a "C"; an opening is provided with in which the mosquito will enter. A funnel is placed within the opening and allows the mosquito to travel into a mosquito identification box where the mosquito is classified to determine the specific type of mosquito for a given area.

A fan is installed in the tubular housing to create a slight downward draft after the mosquito enters the funnel. The opening at the end of the funnel is large enough for a mosquito to pass into another section of transparent tubing on its way to the mosquito identification box.

The mosquito may also be attracted into the funnel by the introduction of an attractant such as heat, light or a chemical attractant. A section of tubing that contains a funnel provides a path for the mosquito. The funnel is made from screen material so that the air flow passes easily through the funnel material.

Attached to the tapered tip of the cone is another plastic tube. On one end is attached to the tapered tip of the cone and on the other is a transparent catcher to trap the mosquito. Because mosquitoes will not fly in a breeze, it's important that the design of the connection between the funnel tip and the plastic tube is designed in a way to guide the mosquito out of the fan's airflow and into the section of tube where the airflow is negligible. This is accomplished by angling the connection toward the tube, past the screen, so the mosquito is out of the airflow or nearly so. This allows the mosquito to fly down the tube. The wingbeat of the mosquito can only be captured if the mosquito is flying. Between the attachment point for the tip of the funnel and the transparent catcher is the mosquito identification box.

The mosquito will travel through the mosquito identification box. The transparent tubing is placed/inserted through the mosquito identification box and the mosquito remains in the transparent tubing as it travels into the transparent catcher.

The different types of mosquitoes are typically identified by their wingbeat frequency. Within the mosquito identification box is a microcontroller that operates the components of the device including the radiofrequency antenna, a light emitter or emitter array and a light detector or detector array. As the mosquito travels through the mosquito identification box the scattering of the light that is detected by the light detector will capture the wingbeat to help identify the type of mosquito.

As the mosquito leaves the mosquito identification box, it will enter a transparent catcher; a lid is provided on the transparent catcher. The catcher is transparent because mosquitoes will travel towards the light.

NUMBERING REFERENCES

Figure 1:
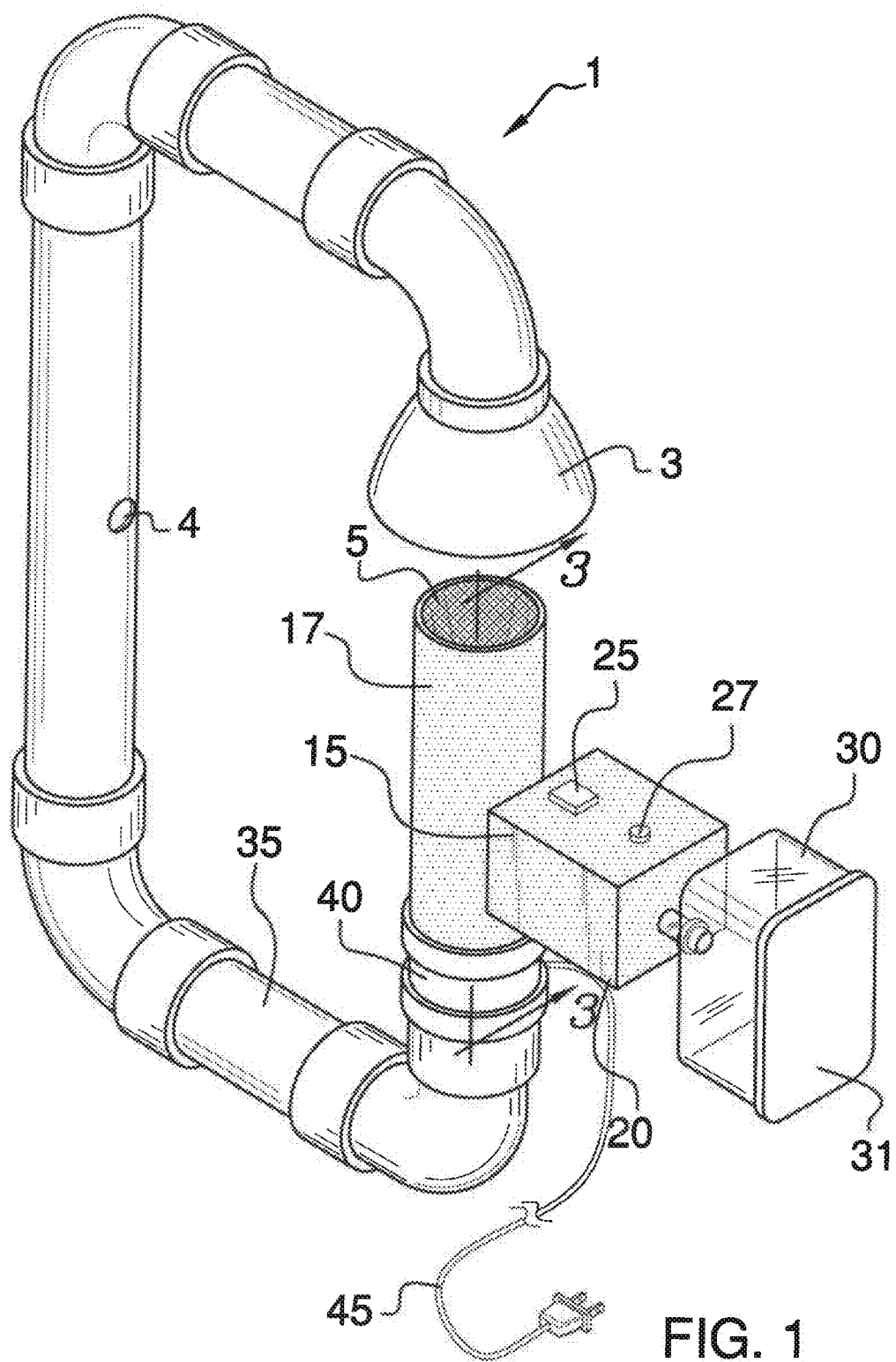
FIG. 1 is an isometric view of the device without the target installed.

1 Device
3 Hood
4 Hole in tubular housing
5 Funnel
6 Target
8 Hood Cover
10 Tapered tip of the funnel
15 Transparent tubing
17 Dark Tube
18 Mesh
19 Connection piece
20 Mosquito Identification Box
21 Light or heat attractant
22 Chemical attractant
25 RF antenna
27 light emitter
29 Light Detector
30 Transparent Catcher
31 Lid
32 Controller
33 Microcontroller
35 Tubular Housing
40 Fan
45 Electrical Plug
47 Battery

DETAILED DESCRIPTION OF THE EMBODIMENTS

This device 1 is a mosquito trap and classification system. It is designed to be portable and will be placed in open outdoor environments to assist in the trapping and then the classification of mosquitoes. Once the classification has occurred, the scientists can then develop an effective strategy to eliminate the type of harmful mosquitoes in any particular area. The challenge in the classification of mosquitoes is to target the relatively small number of mosquitoes that cause harm to humans and animals while maintaining a healthy population of mosquitoes for the food supply in the area. Once the harmful mosquito has been identified, effective strategic use of pesticides can be applied to help control the numbers of harmful mosquitoes.

The device 1 will be comprised of a tubular housing 35 in the general shape of a "C". An opening for a funnel 5 is provided at one end of the tubular housing 35. The funnel 5 provides an entry point for the mosquito and is surrounded by a section of dark tube 17 to ensure that the mosquito travels down the funnel 5. The tip 10 of the funnel 5 will be connected to one end of a section of transparent tubing 15 with a connection piece 19. The connection piece 19 will ensure that the tip 10 of the funnel 5 will remain attached to the transparent tubing 15 during the normal operation of the device 1.

A fan 40 is placed in the tubular housing 35 below the tip 10 of the funnel 5 and will provide a draft of air to direct the mosquito downward and eventually into the section of transparent tubing 15.

Figure 2:
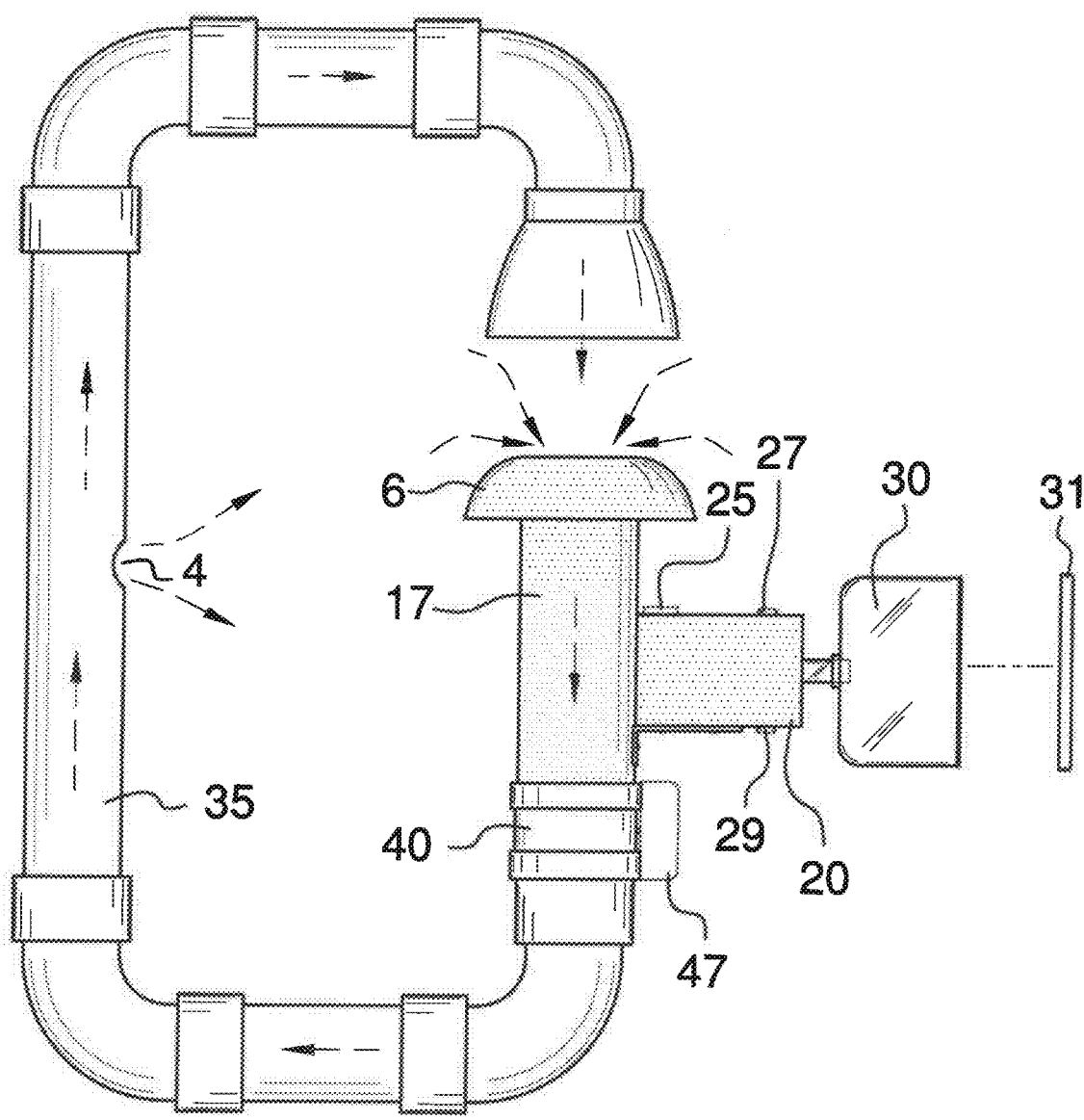
FIG. 2 is a side view of the device with the target installed.

A hole 4 in the tubular housing 35 is provided to allow some of the air flow to escape as it circulates within the confines of the C-shaped tubular housing 35. While it is important to allow air to freely circulate, it is also important to limit the amount of air flow so that a mosquito will enter the opening. The hole 4, which is strategically placed opposite from the target 6 on the side of the tubular housing 35, as shown in FIG. 2, displaces some of the air flow and also directs some of the air flow to the target 6. Additionally, a hood 3 is placed over the end of the tubing. The hood 3 serves two general purposes: to contain the air flow while at the same time expanding the area surrounding the air flow to reduce the pressure of the air flow as it leaves the C-shaped tubular housing 35. As mentioned previously with regard to the hole 4, the use of the hood 3 serves to displace the air flow as it leaves the tubular housing and helps to direct the mosquito past the target 6 and into the opening with the funnel 5. A hood cover 8 that will allow the flow of air through the hood cover 8 is provided to prevent the entry of debris from the outside.

Attractants such as heat 21 or chemical 22 may also be placed within the hood 3 to lure the mosquito. The attractants are thus mixed with the air circulated throughout the tubular housing 35.

A target 6 may also be placed over the opening. This target 6 may be either black or red; it has been discovered that different types of mosquitoes are attracted by different colors. For instance, the mosquito that causes malaria is attracted to the color black while the mosquito that is responsible for the Zika virus is attracted to the color red.

Figure 3:
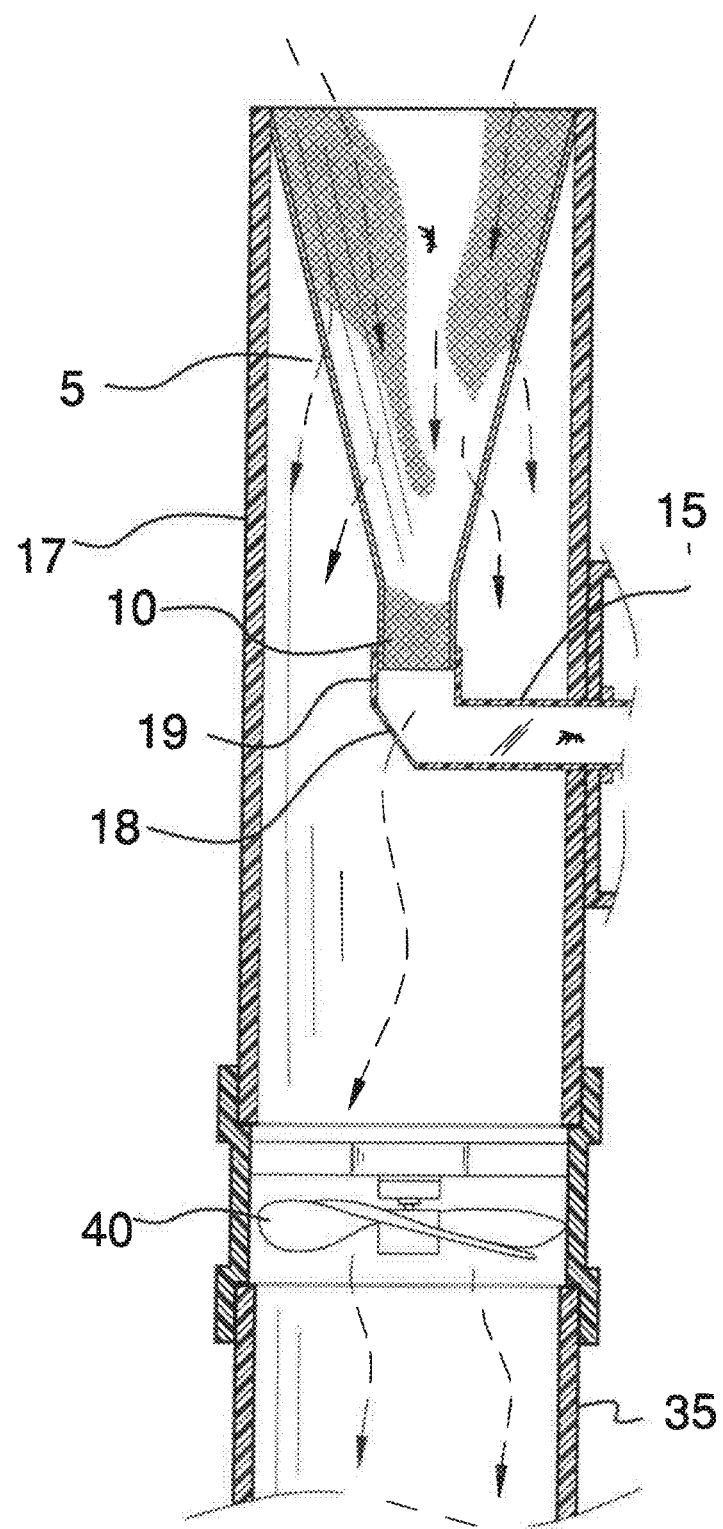
FIG. 3 is a cross-sectional view according to Line 3-3 on FIG. 1.
Figure 4:
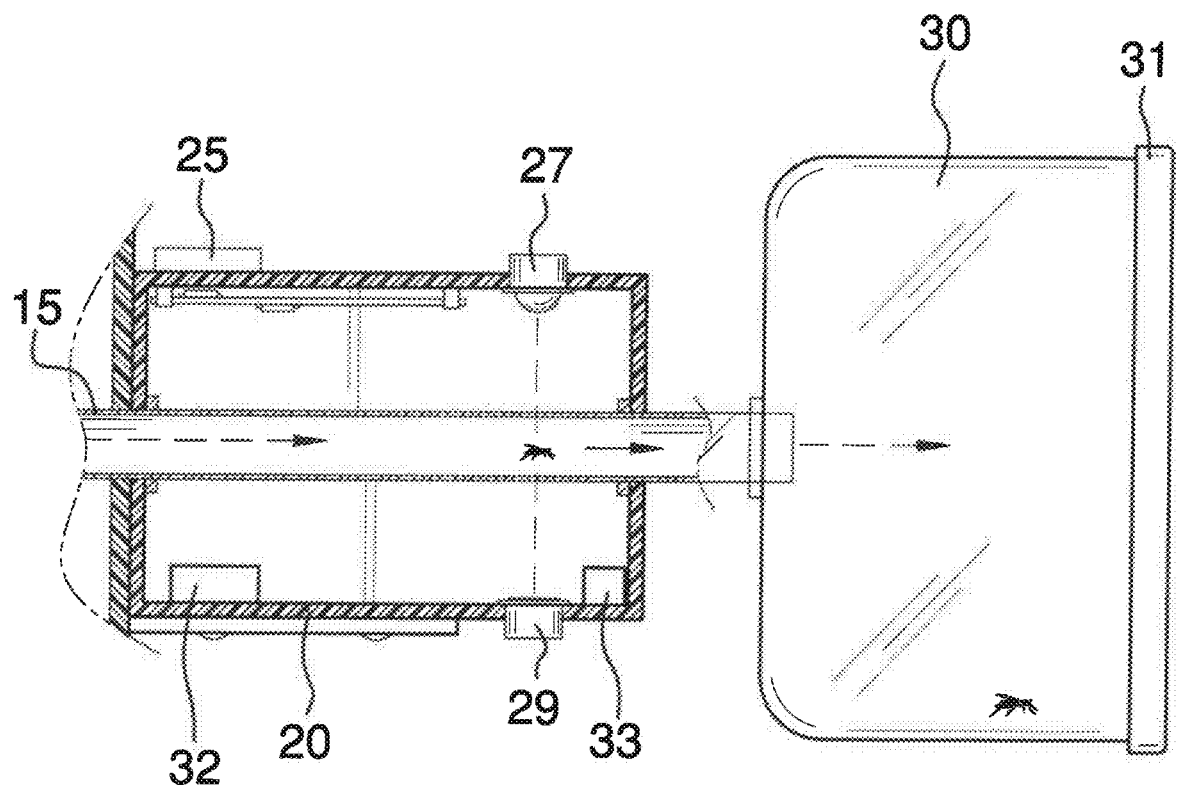
FIG. 4 is a detailed view of the mosquito identification box and the transparent catcher.
Figure 5:
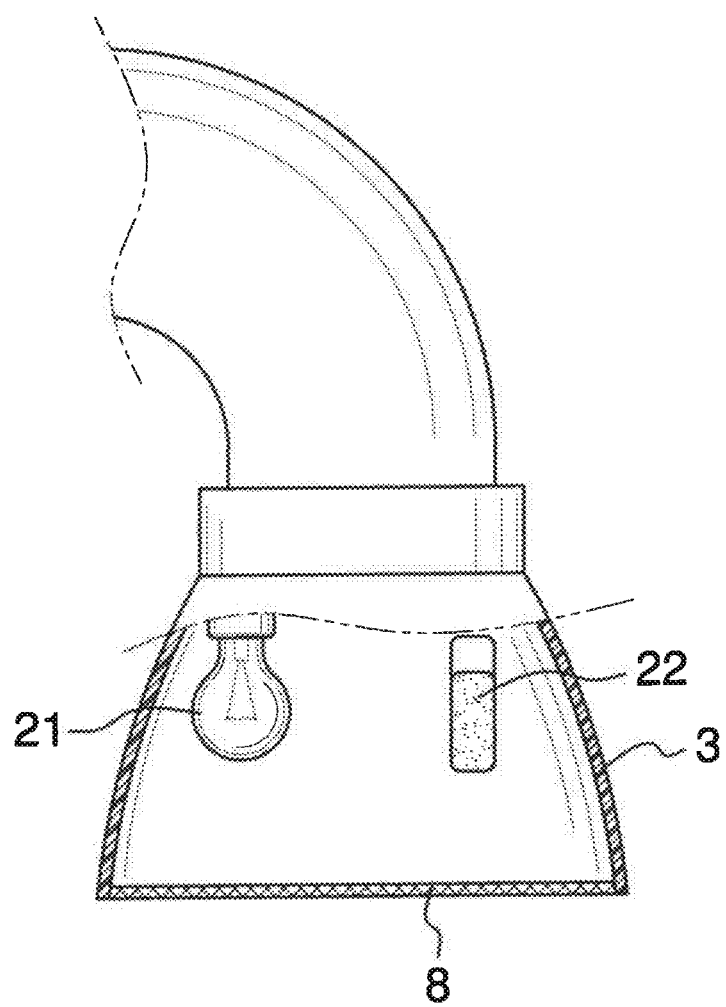
FIG. 5 is a cross-sectional view of the hood.

A dark tube 17 will surround the opening with the funnel. It has been determined that mosquitoes are attracted to dark areas and the purpose of the dark tube is to block as much ambient sunlight as possible to encourage the mosquito to travel into and down the funnel 5, which is constructed from porous or screen material to allow the passage of air through the funnel 5. The funnel 5 will taper to a tip 10 as depicted in FIG. 3; the attachment point at the end of the funnel 5 connects to the connection piece 19 to guide the mosquito into the transparent tubing 15. As depicted in FIG. 3 the mosquito travels through the tip 10 of the funnel 5 and into the area of the transparent tubing 15. The mesh 18, which is slightly angled, is provided to ensure the free flow of air through the device 1. The bottom section of the transparent tubing 15 connects to the mesh 18 but is slightly longer than the top section of the transparent tubing 15, which is shown in FIG. 3. The mesh 18 is provided in the end of the transparent tubing 15 to ensure that the air flow is not impeded and to prevent the mosquito from traveling outside the device 1 but instead to move into the transparent tubing 15 and eventually into the mosquito identification box 20.

The mosquito identification box 20 abuts the dark tube 17. The section of transparent tubing 15 will thread or insert through the interior of the mosquito identification box 20. This will insure that the mosquito will travel the distance of the mosquito identification box 20 and enter the transparent catcher 30 as it leaves the mosquito identification box 20.

As the mosquito enters the transparent tubing 15 it will travel into a mosquito identification box 20. Within the box is a radio frequency antenna 25, a light emitter 27 and a light detector 29. The mosquito identification box 20 is also made of dark material so that the mosquito travels down the tubing then through the mosquito identification box 20, and towards the light and into the transparent catcher 30, which is connected to the transparent tubing 15 at its other end. A lid 31 is provided on the transparent catcher 30 as depicted in FIG. 2.

As the mosquito travels down the horizontally positioned transparent tubing 15 and into the mosquito identification box 20, the mosquito is classified according to its wingbeat frequency by a microcontroller 33 as it travels past the light emitter 27 and light detector 29. Within the mosquito identification box 20 a light emitter 27 will provide a stream of light, which will be scattered by the wingbeat of the mosquito as the mosquito flies through the mosquito identification box 20 and into the transparent catcher 30.

A controller 32 is placed within the mosquito identification box 20 to operate the radio frequency antenna 25, light emitter 27, light detector 29 and fan 40) of the device 1. A power source, which can be either alternating current or a direct current source is also provided.

ALTERNATIVE EMBODIMENT

The device 1 itself will work just as the first embodiment does except that the funnel 5 is inverted. The purpose of inverting the funnel 5 is to ensure that trash (leaves and twigs as examples) does not clog the entrance to the funnel 5 and prevent the mosquito from entering the device 1. The device 1 will operate in the same fashion in this embodiment as the first embodiment.

The invention claimed is:
1. A trap for mosquito classification which is comprised of:
   a. a tubular housing;
      wherein the tubular housing provides a top opening and a bottom opening;
   b. a hood;
      wherein the hood is attached to the tubular housing;
   c. an attractant;
      wherein the attractant is placed in the hood;
   d. a hood cover;
      wherein the hood cover is attached to the hood;
      wherein the hood cover is porous;
   e. a funnel;
      wherein the funnel is placed in the top opening of the tubular housing
      wherein the funnel is porous;
      wherein a tapered tip is provided on the funnel;
   f. a target;
      wherein a target is placed over the opening for the funnel;
   g. a section of dark tubing;
      wherein the target is placed over the opening of the section of dark tubing;
      wherein the section of dark tubing surrounds the funnel;
   h. transparent tubing;
      wherein the transparent tubing provides a first end and a second end;
      wherein the transparent tubing has a mesh opening;
      wherein the mesh opening allows air to pass through it;
   i. a mosquito identification box;
      said mosquito identification box abuts the section of dark tubing;
      wherein a microcontroller is placed within the mosquito identification box;
      said microcontroller operates the components of the trap;
      wherein the microcontroller captures wingbeat frequency data;
      wherein the transparent tubing is inserted through the mosquito identification box;
   j. a catcher;
      wherein the catcher is secured to the second end of the transparent tubing;
      wherein the catcher has a lid;
   k. a fan;
      wherein the fan is provided within the tubular housing;
   l. a radiofrequency antenna;
      said radiofrequency antenna is housed in the mosquito identification box;
   m. a light emitter;
      said light emitter is housed in the mosquito identification box;
   n. a light detector;
      said light detector is housed in the mosquito identification box;
   o. a controller;
      wherein the controller is provided within the mosquito identification box;
      wherein the controller is connected to the fan, the radiofrequency antenna, the light emitter, and the light detector;
   p. a power source.

2. The trap for mosquito classification as described in claim 1 wherein the power source is alternating current.

3. The trap for mosquito classification as described in claim 1 wherein the power source is direct current.

4. The trap for mosquito classification as described in claim 1 wherein the light emitter provides a source of light.

5. The trap for mosquito classification as described in claim 1 wherein the light detector detects the scattering of light within the mosquito identification box.

6. The trap for mosquito classification as described in claim 1 wherein the target is red.

7. The trap for mosquito classification as described in claim 1 wherein the target is black.

8. The trap for mosquito classification as described in claim 1 wherein the attractant is a chemical.

9. The trap for mosquito classification as described in claim 1 wherein the attractant is heat.

10. The trap for mosquito classification as described in claim 1 wherein the attractant is light.

11. The trap for mosquito classification as described in claim 1 wherein a connection piece is used to connect the tip of the funnel to the first end of the transparent tubing.

12. The trap for mosquito classification as described in claim 1 wherein a hole is provided in the tubular housing.

13. The trap for mosquito classification as described in claim 1 wherein the power source is provided through an electrical outlet, which the trap plugs into.

14. The trap for mosquito classification as described in claim 1 wherein the power source is a battery.

\* \* \* \* \*